United States Patent
Toyamasaki

(10) Patent No.: US 8,351,066 B2
(45) Date of Patent: Jan. 8, 2013

(54) IMAGE FORMING APPARATUS PROVIDING A PLURALITY OF FUNCTIONS

(75) Inventor: Kenta Toyamasaki, Higashiosaka (JP)

(73) Assignee: Kyocera Document Solutions Inc. (JP)

( * ) Notice: Subject to any disclaimer, the term of this patent is extended or adjusted under 35 U.S.C. 154(b) by 1024 days.

(21) Appl. No.: 12/356,911

(22) Filed: Jan. 21, 2009

(65) Prior Publication Data

US 2009/0190169 A1    Jul. 30, 2009

(30) Foreign Application Priority Data

Jan. 30, 2008  (JP) ................... 2008-018656

(51) Int. Cl.
 *G06F 3/12* (2006.01)
(52) U.S. Cl. .............. 358/1.15; 358/1.1; 358/1.13
(58) Field of Classification Search ............. 358/1.1, 358/1.2, 1.9, 1.13, 400, 401, 468, 296
 See application file for complete search history.

(56) References Cited

U.S. PATENT DOCUMENTS

2004/0170443 A1 * 9/2004 Maeshima ............... 399/82

FOREIGN PATENT DOCUMENTS

JP    2005-212137 A    8/2005

* cited by examiner

*Primary Examiner* — Thomas D Lee
(74) *Attorney, Agent, or Firm* — Ostrolenk Faber LLP

(57) ABSTRACT

An image forming apparatus includes a display section, a storage section, and a continuation reception section. The display section displays a plurality of setting items, and the setting items relate to only one of the plurality of functions. The storage section stores a single or plurality of groups of setting items relating to a function in a time-series manner. The continuation reception section receives an option of whether or not the provided function is continuously executed. When receiving the option, the continuation reception section causes the display section to display the group of the setting items and to display the history data in a list to select one from the single or plurality of groups of the setting items. When receiving the option for not continuously executing the provided function, the continuation reception section initializes setting of the provided function and clears all the history data.

12 Claims, 13 Drawing Sheets

801

811

| NUMBER | NUMBER OF PAPER | SETTING INFORMATION ||||||
| --- | --- | --- | --- | --- | --- | --- | --- |
| | | PAPER SELECTION | DENSITY | SCALE FACTOR | STAPLE | DESTINATION OF IMAGE DATA | NAME OF IMAGE DATA |
| 1ST | 1 | A4 NORMAL PAPER | 3 | 100 | SINGLE / UPPER LEFT | DOCUMENT BOX A | BULLETIN |
| 2ND | 4 | A5 NORMAL PAPER | 4 | 75 | SINGLE / UPPER MIDDLE | DOCUMENT BOX B | PROJECT PROPOSAL |

| NUMBER | SETTING INFORMATION | | | | | | |
|---|---|---|---|---|---|---|---|
| | DESTINATION OF TRANSMISSION | NAME OF DESTINATION | NUMBER OF PAPER | PAPER SELECTION | QUALITY OF IMAGE | DESTINATION OF IMAGE DATA | NAME OF IMAGE DATA |
| 1ST | 0123456789 | USER C | 1 | A4 NORMAL PAPER | CHARACTER ONLY | DOCUMENT BOX C | REQUEST |
| 2ND | 0987654321 | USER D | 5 | A5 NORMAL PAPER | PICTURE | DOCUMENT BOX D | PLAN |
| 3RD | 0654987321 | USER E | 4 | A5 NORMAL PAPER | PICTURE | DOCUMENT BOX E | SPECIFICATION |

FIG. 8B

IMAGE FORMING APPARATUS PROVIDING A PLURALITY OF FUNCTIONS

CROSS-REFERENCE TO RELATED APPLICATIONS

This application claims priority under 35 U.S.C. §119 to Japanese Patent Application No. 2008-018656 filed on Jan. 30, 2008. The entire disclosure of Japanese Patent Application No. 2008-018656 is hereby incorporated herein by reference.

BACKGROUND OF THE INVENTION

Field of the Invention

The present invention generally relates to an image forming apparatus, and more specifically to an image forming apparatus for enhancing convenience of a functional setting when the functional setting is repeatedly executed and for preventing a user from performing a functional setting in an erroneous way when the functional setting has previously been completed.

Recently, image forming apparatuses (e.g., scanners, copiers, and multifunction peripherals (MFP)) have been provided with a plurality of functions. A user is capable of performing a detailed functional setting of the image forming apparatus.

Some image forming apparatuses are configured to display a plurality of setting items of a function and a predetermined switching item on their attached touch panels. When a user selects the switching item through the touch panel, a screen of the touch panel is switched from a currently displayed screen for displaying setting items of a function to another screen for displaying setting items of another function.

Also, some image forming apparatuses are configured to provide a user with a function having once-inputted setting items, and to store the once-inputted setting items without any changes. Accordingly, the image forming apparatuses are capable of repeatedly providing a user with the function having the same setting items. The configuration reduces a user's operational load and enhances the user's operational convenience.

On the other hand, when the once-inputted setting items of a function are continuously stored without any changes, the stored setting may block a user from inputting a new functional setting into the image forming apparatuses. Additionally, the stored setting may have an impact on a user's setting, and a user may be provided with an unexpected functional setting.

In response to this, some image forming apparatuses employ the automatic reset technology. Specifically, the image forming apparatuses are configured to initialize (i.e., reset) setting of a function when a predetermined period of time is elapsed after setting items of the function are completed or after a user is provided with the function having the setting items. With the technology, a user is capable of smoothly inputting a setting as desired without being disturbed by the previously inputted setting.

Furthermore, Japanese Patent Application Publication No. JP-A-2005-212137 discloses an image forming apparatus including storage means and data writing means. The storage means is configured to store setting items as history data. The data writing means is configured to read inputted setting items and automatically write the setting items in the storage means in a sequential order. The history data are configured to be displayed in a list form. Also, the patent application publication describes the following merits. A user does not need to register setting items. A user is also capable of confirming a plurality of contents in the history data. Consequently, a user is capable of easily and quickly performing a setting operation of the apparatus.

However, the above-mentioned automatic reset technology may not work effectively in the following environment. For example, when an image forming apparatus is installed in a convenience store or a library, the image forming apparatus will be heavily used by many people. In this case, a user possibly uses the image forming apparatus before a predetermined period of time is elapsed to reset automatically a previously-inputted setting.

When the automatic reset technology does not work, the previously inputted setting may be left and stored. Accordingly, the previously-inputted setting may have a negative impact on a user's setting operation, and a user can perform an erroneous setting operation. Specifically, a user may perform an erroneous photocopy or erroneous fax. This results in waste of paper and toner. A user tends to use the above-mentioned erroneous setting especially in the recent image forming apparatuses. This is because the recent image forming apparatuses are provided with a lot of setting items and a user does not easily notice the previously-inputted setting.

On the other hand, there is a drawback when an image forming apparatus is not provided with the automatic reset technology but provided with such a technology that a functional setting is reset every time a user is provided with the function. If a user wants to use repeatedly a function setting, the user is required to input repeatedly the functional setting into the image forming apparatus. This makes the user feel annoyed and slows down the user's operation.

The image forming apparatus disclosed in the above-mentioned patent application publication has merit in that a user is capable of confirming contents of the history data. Meanwhile, it has a drawback that not only a user having actually inputted the history data but also an arbitrary user is capable of confirming the contents of the history data.

Nowadays the history data include the destination of image data, name of image data, and destination of a transmission function (e.g., a facsimile number and an email address of a client/customer) in addition to conventionally used data (e.g., scale factor and paper size). If a third party gets the data, the data may be abused and this may cause an information security problem.

Accordingly, aspects of the present invention have been created to solve the above-mentioned problems occurring in the conventional practice, and to provide an image forming apparatus for enhancing convenience of a functional setting when the functional setting is repeatedly performed and for preventing a user from performing a functional setting in an erroneous way when the functional setting has previously been completed.

In view of the above, it will be apparent to those skilled in the art from this disclosure that there exists a need for an improved image forming apparatus. This invention addresses this need in the art as well as other needs, which will become apparent to those skilled in the art from this disclosure.

SUMMARY OF THE INVENTION

For the purpose of solving the above-mentioned problems and achieving the object, an image information apparatus is provided. A first aspect of the present invention relates to an image forming apparatus configured to provide a plurality of functions. The image forming apparatus includes a display section, a storage section, and a continuation reception section. The display section is configured to display a plurality of setting items as a group, and the setting items relate to only one of the plurality of functions. The storage section is configured to store a single or plurality of groups of setting items relating to a function in a time-series manner as history data when the function is provided. The continuation reception section is configured to receive an option of whether or not the provided function is continuously executed. When the continuation reception section receives the option for continuously executing the provided function, the continuation reception section is configured to cause the display section to display the group of the setting items relating to the provided function and to display the history data in a list form for selecting one from the single or plurality of groups of the setting items relating to the provided function. When the continuation reception section receives the option for not continuously executing the provided function, the continuation reception section is configured to initialize the setting of the provided function and to clear all the history data.

A second aspect of the present invention relates to the image forming apparatus of the first aspect. In the second aspect, the image forming apparatus of the first aspect further includes a timer section. The timer section is configured to count a predetermined period of time after the function is provided. In this case, when the predetermined period of time is elapsed, the continuation reception section is configured to initialize the settings of the function and to clear all the history data.

According to the image forming apparatus of the present invention, when a function is continuously executed, a single or plurality of groups of setting items relating to the function is displayed and the history data are displayed in a list form for selecting one from the single or plurality of groups of setting items. On the other hand, when a function is not continuously executed, setting of the function is initialized and the history data is all cleared.

Accordingly, when a user continuously uses a function, the user is capable of inputting a new setting for the function and is capable of causing the image forming apparatus to execute promptly the function having the previous setting with use of the history data. Thus, a user is provided with a variety of options for setting the function. When a user continuously executes a setting, the user is capable of omitting an input for the setting. In other words, user's operational load will be reduced and user's operational convenience will be enhanced.

On the other hand, when a user does not continuously execute a function, the functional setting is initialized and the history data are all cleared. Therefore, when a user newly executes a functional setting, the user is not disturbed by a previous functional setting. Accordingly, a user will be prevented from performing an erroneous operation (e.g., erroneous photocopy). Additionally, the stored history data are not abused by a third party. Accordingly, information security will be protected. Furthermore, the history data are not left stored in the storage. Therefore, the storage volume is not uselessly and continuously occupied by the history data.

Also, when a predetermined period of time has elapsed after the function is provided, the functional setting is initialized and the history data are all cleared.

Accordingly, even when a user does not make a selection of whether or not a function is continuously executed, initialization and clearance of the history data are performed after a predetermined period of time has elapsed. Therefore, initialization and clearance of the history data are automatically performed even when a user forgets to make the selection or a user is temporarily away from the image forming apparatus on an urgent business. Accordingly, a user is capable of smoothly performing a setting operation as desired without being disturbed by a previous setting. Additionally, a third party has extremely low chance of obtaining the history data.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 8A is a view of a history data table of the image forming apparatus;

FIG. 8B is a view of another history data table of the image forming apparatus.

DETAILED DESCRIPTION OF THE EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
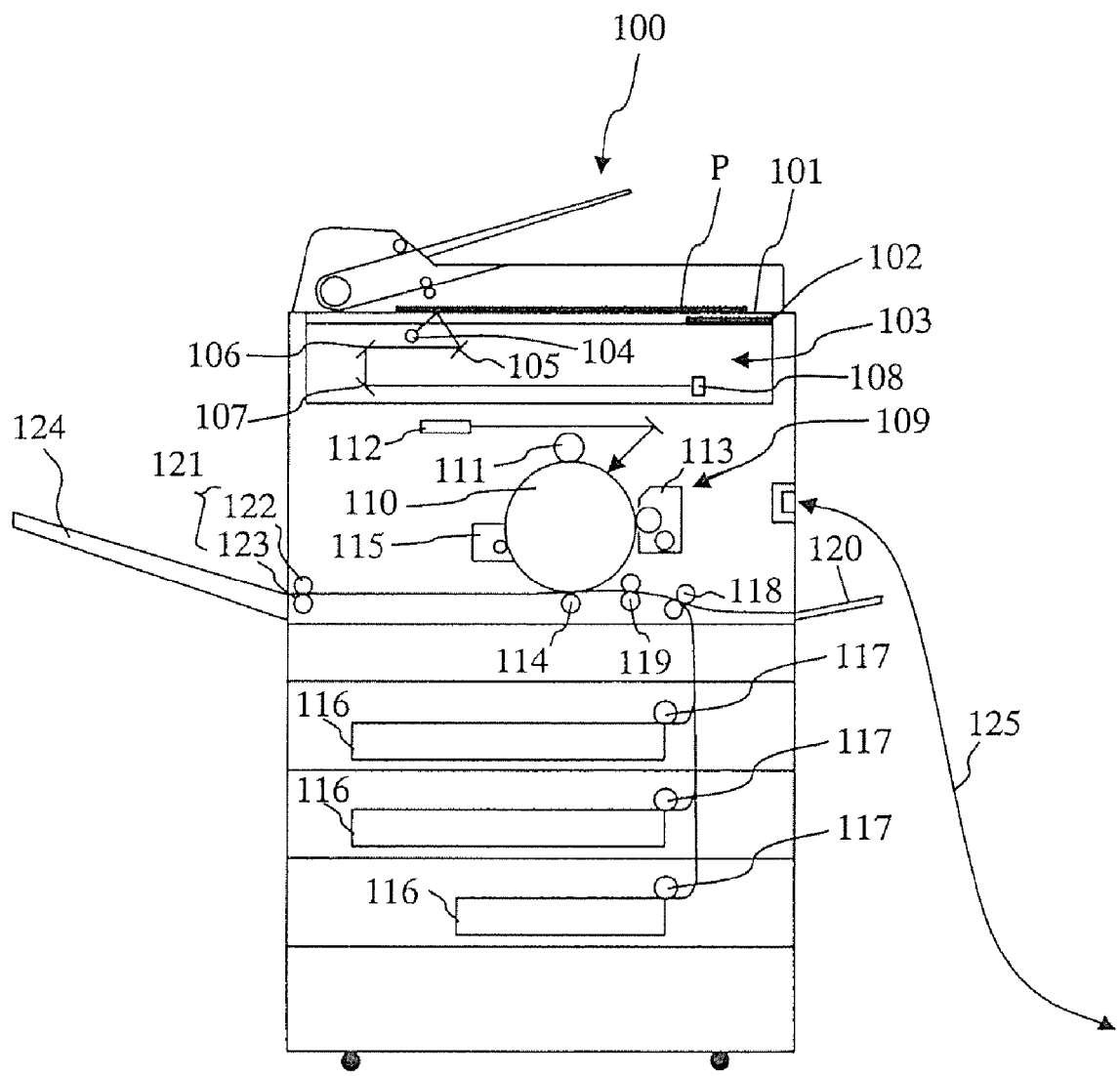
FIG. 1 is a view of a cross-sectional schematic diagram illustrating an entire configuration of an image forming apparatus according to a preferred embodiment of the present invention.
Figure 2:
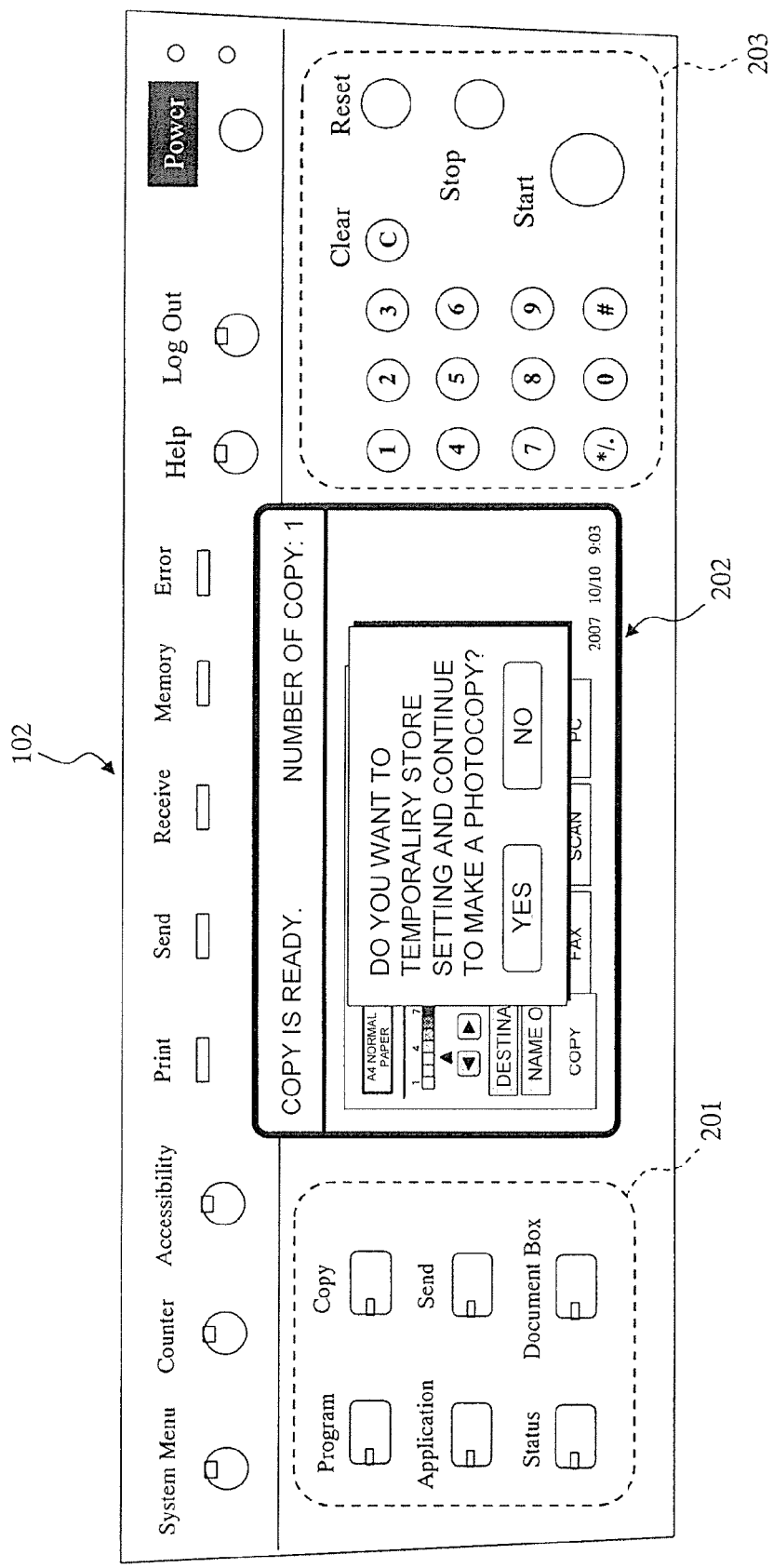
FIG. 2 is a view of a diagram illustrating an example of the exterior of an operating section provided in the image forming apparatus.

FIG. 1 is a view of a schematic diagram illustrating the entire configuration of the interior of an image forming apparatus according to a preferred embodiment of the present invention. FIG. 2 is a view of a diagram illustrating an example of the exterior of an operating section provided in the image forming apparatus. Specifically, the image forming apparatus includes a digital copier, a printer, a multifunction peripheral (MFP), or the like. A MFP will be hereinafter exemplified as the image forming apparatus. Also, an operation of photocopying a manuscript (i.e., print processing) by the image forming apparatus will be hereinafter briefly explained.

First, when a user makes a photocopy with the image forming apparatus 100, the user puts a manuscript P on a platen 101 arranged on the upper surface of the image forming apparatus 100, and inputs a copy function setting through an operating section 102.

The operating section 102 is provided with a plurality of function keys 201, a touch panel 202, and a variety of keys 203. When a user presses a "Copy" key of the function keys 201, a plurality of setting items corresponding to a copy function are displayed on the touch panel 202. In other words, setting items corresponding to other functions other than the copy function are not displayed on the touch panel 202.

Then, a user is capable of selecting a desired setting item from the displayed setting items through the touch panel 202. Furthermore, a user is capable of confirming the desired setting with the variety of keys 203 (e.g., ten keys). When a user confirms the setting and then presses a "Start" key of the variety of keys 203, print processing will be started based on the setting.

When print processing is started, light irradiated by a light source 104 is reflected by the manuscript P disposed on the platen 101 in an image scanning section 103. The reflected light is guided to an image sensor 108 through mirrors 105 and 106, and 107. The image sensor 108 performs photoelectric conversion with respect to the guided light. Thus, an image on the manuscript P is scanned as image data.

The scanned image data are transmitted to an image forming section 109, and is then transferred as a toner image. The image forming section 109 includes a photosensitive drum 110. The photosensitive drum 110 is configured to rotate in a predetermined direction at a constant velocity. A variety of elements are disposed around the photosensitive drum 110. Specifically, an electrostatic charger 111, an exposing unit 112, a developing unit 113, a transfer unit 114, and a cleaning unit 115 are sequentially arranged from the upstream of the rotational direction of the photosensitive drum 110.

The electrostatic charger 111 is configured to charge uniformly the surface of the photosensitive drum 110. The exposing unit 112 is configured to irradiate a laser onto the surface of the electrically-charged photosensitive drum 110 based on image data. Thus, an electrostatic latent image is formed on the photosensitive drum 110. The developing unit 113 is configured to form a toner image by attaching toner to the electrostatic latent image to be transported. The transfer unit 114 is configured to transfer the formed toner image to a recording medium (e.g., a sheet of paper). The cleaning unit 115 is configured to remove excess toner remaining on the surface of the photosensitive drum 110. The above-mentioned series of processing steps are performed every time the photosensitive drum 110 rotates.

A sheet of paper is transported from any one of a plurality of paper feeding cassettes 116 provided in the image forming apparatus 100. More specifically, a sheet of paper is taken out of any of the paper feeding cassettes 116 by way of a pickup roller 117. The pickup roller 117 is provided for each of the paper feeding cassettes 116. Then, the taken-out paper is transported through a transporting path. The paper feeding cassettes 116 can respectively accommodate different kinds of paper. A sheet of paper is fed from any of the paper feeding cassettes 116 based on an inputted setting of the copy function.

The paper taken out to the transporting path is transported between the photosensitive drum 110 and the transfer unit 114 by way of a transfer roller 118 and a resist roller 119. Then, the transfer unit 114 transfers the toner image onto the transported paper. The paper with the toner image is then transported to a fixing device 121. The paper may be transported from a manual feeding tray 120 to the transfer roller 118. The manual feeding tray 120 is attached to the lateral side of the image forming apparatus 100.

The paper with the transferred toner image is passed between a heat roller 122 and a pressure roller 123. The fixing device 121 is provided with the heat roller 122 and the pressure roller 123. Here, heat and pressure are applied to the toner image. Thus, a visible image is fixed on the paper. The amount of heat applied by the heat roller 122 is optimally set depending on a kind of paper. Thus, fixing processing is appropriately performed. When the visible image is fixed to the paper and thus the image formation is completed, the paper is stacked on a paper discharge tray 124 as a printed material. The paper discharge tray 124 is attached to the lateral side of the image forming apparatus 100.

The basic print processing of the image forming apparatus 100 is performed as described above. Also, the image forming apparatus 100 is provided with a communication section (not illustrated in the figure) for communicating with other machines. As illustrated in FIG. 1, a communication cable 125 is connected to the lateral side of the image forming apparatus 100. With the configuration, the image scanning section 103, the image forming section 109, and the communication section realize a variety of functions other than the copy function (e.g., a facsimile sending/receiving function, a scan function, and a PC sending/receiving function) when they are cooperatively driven. A section for performing the copy function and the other functions are hereinafter referred to as a function providing section. The function providing section will be explained in the following paragraphs.

Figure 3:
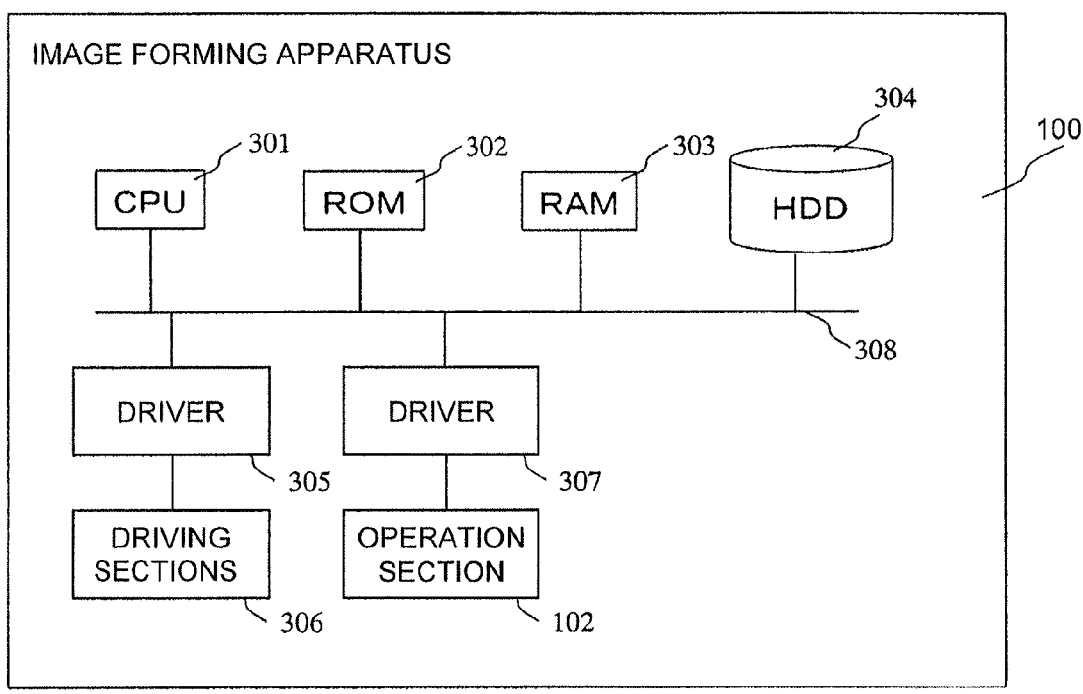
FIG. 3 is a view of a diagram illustrating the control hardware configuration of the image forming apparatus.

Next, a control hardware configuration of the image forming apparatus 100 will be hereinafter explained with reference to FIG. 3. FIG. 3 is a view of a schematic diagram of the control hardware configuration of the image forming apparatus 100. Note that FIG. 3 does not illustrate all elements in the control hardware configuration. When elements do not directly relate to the present invention, detailed illustration of those elements is omitted.

In the image forming apparatus 100, a central processing unit (CPU) 301, a read only memory (ROM) 302, a random access memory (RAM) 303, a hard disk drive (HDD) 304, a driver 305 corresponding to driving sections 306, and a driver 307 corresponding to the operating section 102 are connected through an internal bus 308.

For example, the CPU 301 uses the RAM 303 as a work space, and executes programs stored in the ROM 302, the HDD 304, and the like. Furthermore, the CPU 301 transmits/receives data and commands to/from the drivers 305 and 307 based on the result of executed programs. Thus the CPU 301 controls actions of the driving sections 306 (e.g., the image scanning section 103 and the image forming section 109 illustrated in FIG. 1). Additionally, the after mentioned elements (see FIG. 4) other than the driving sections 306 are realized when the CPU 301 executes programs and transmits/receives data and commands to/from the drivers 305 and 307. The ROM 302 and the HDD 304 store a program and data for realizing the after-mentioned elements.

Figure 4:
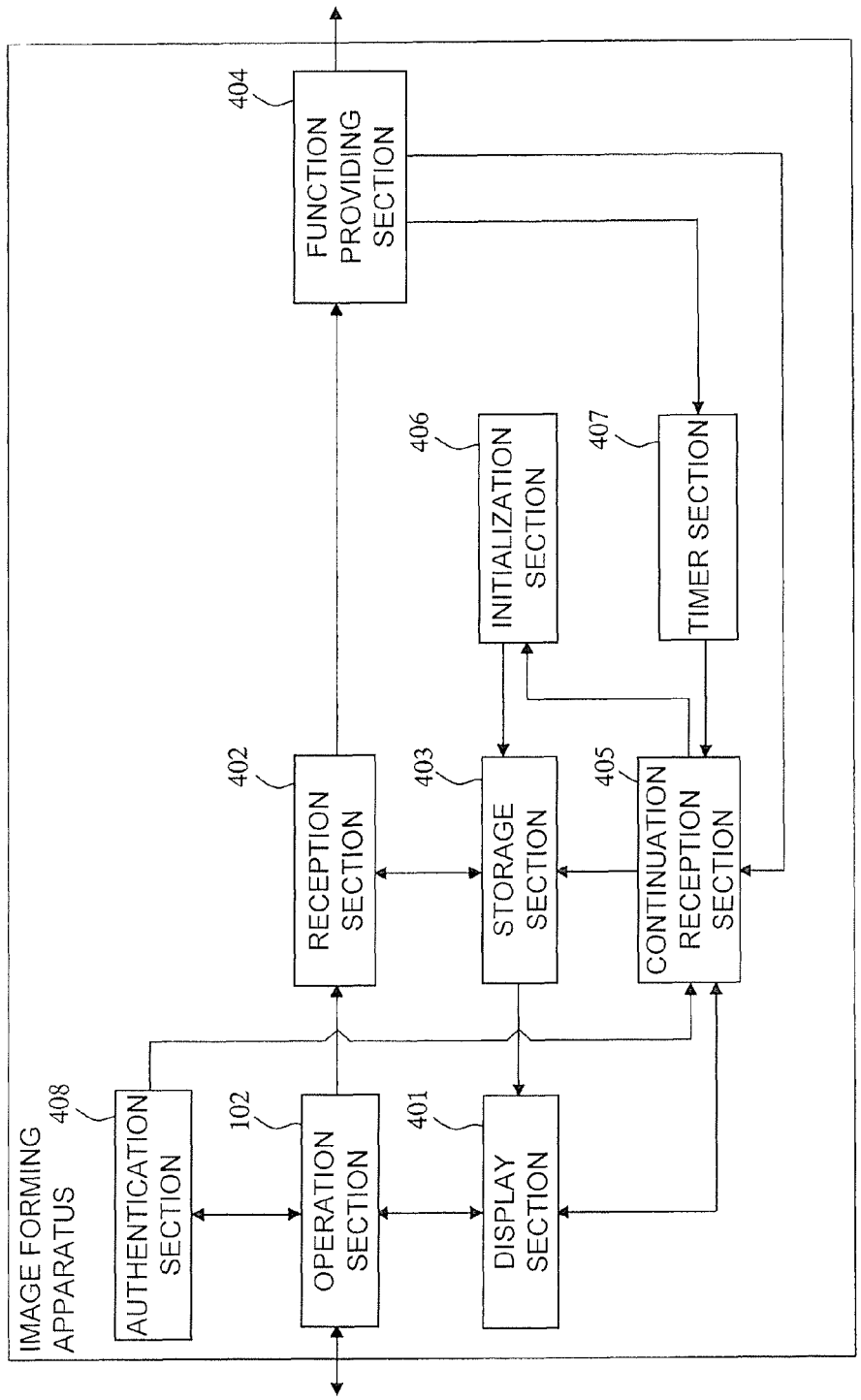
FIG. 4 is a view of a functional block diagram of the image forming apparatus.
Figure 9:
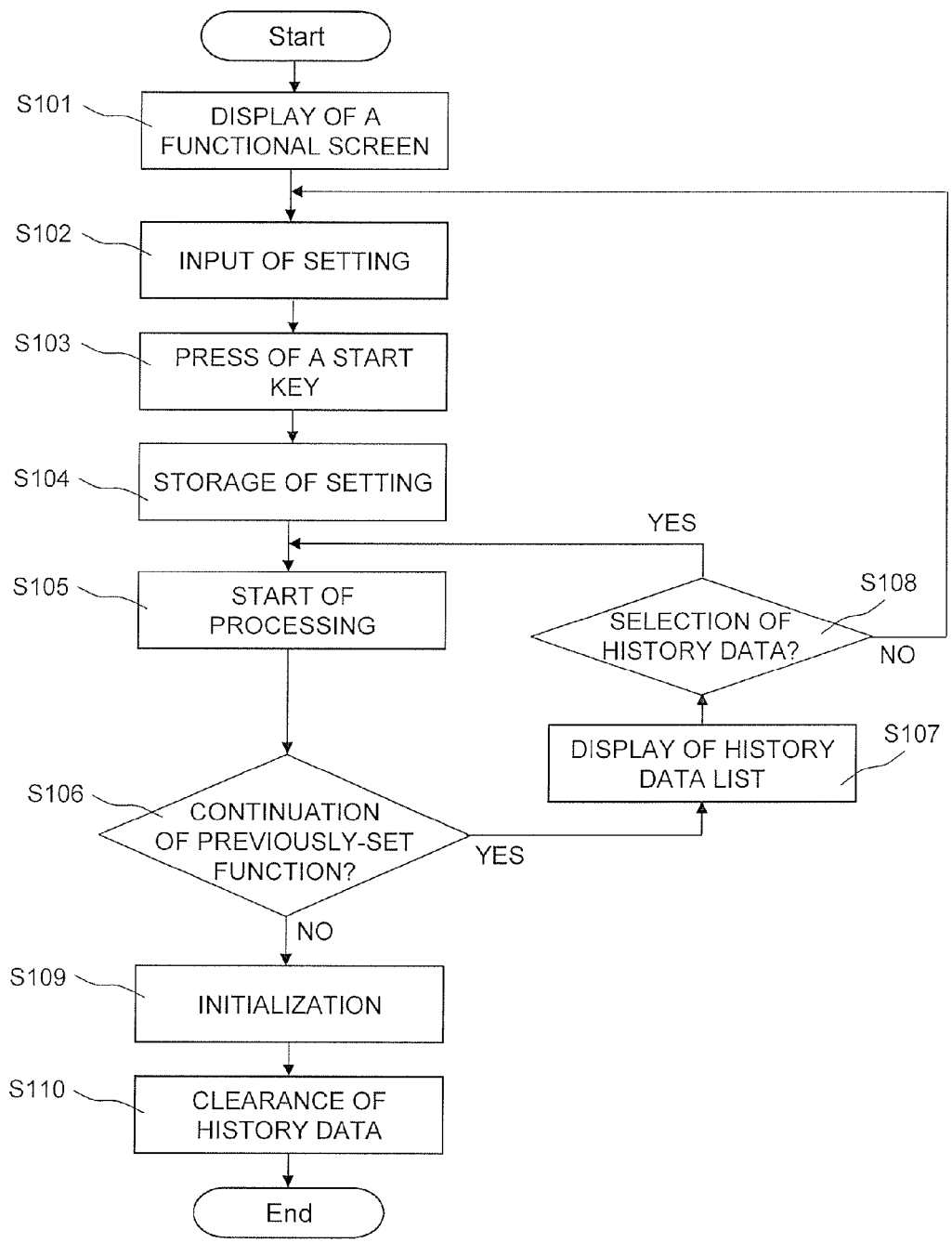
FIG. 9 is a view of a flowchart illustrating a series of setting procedures for the image forming apparatus.

Next, a procedure of repeatedly performing an operation of setting a function in the image forming apparatus of the present embodiment will be hereinafter explained with reference to FIGS. 4 to 9. FIG. 4 is a view of a functional block diagram of the image forming apparatus 100 of the present embodiment. FIGS. 5A, 5B, 6A, 6B, 7A, and 7B respectively illustrate an example of a screen to be displayed on the touch panel 202 of the operating section 102. FIGS. 8A and 8B respectively illustrate a history data table to be stored in the storage section. FIG. 9 is a view of a flowchart illustrating a procedure of repeatedly performing an operation of setting a function.

Figure 5A:
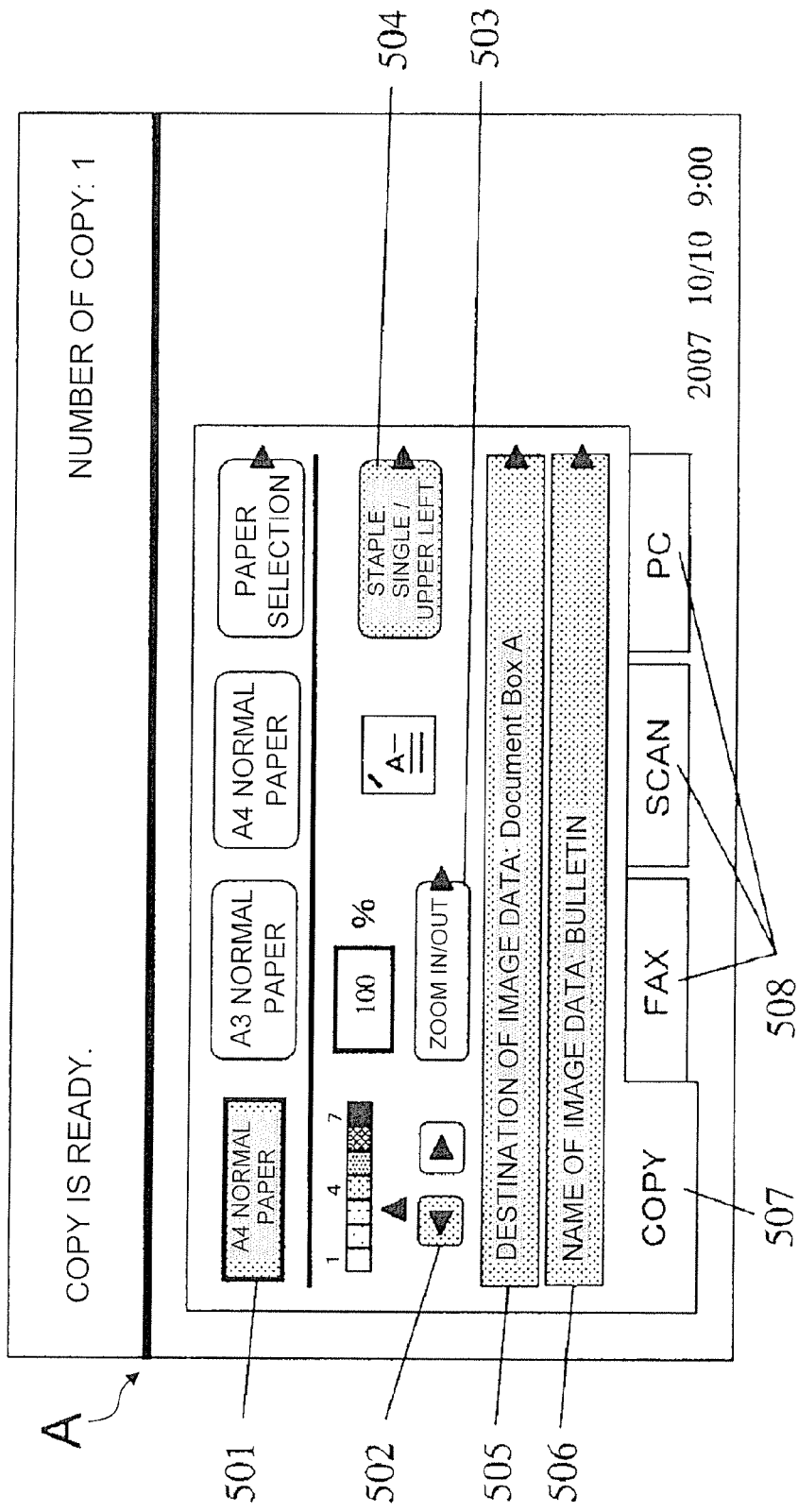
FIG. 5A is a view of a first diagram illustrating an example of a screen displayed on a touch panel of the image forming apparatus.

First, when a user puts a manuscript P on the platen 101 and presses the function key "Copy" for causing the image forming apparatus 100 to execute a copy function, a display section 401 displays a screen relating to a copy function (hereinafter simply referred to as "a copy screen") on the touch panel 202 as illustrated in FIG. 5A (Step S101 of FIG. 9). Note that the image forming apparatus 100 is capable of providing a plurality of functions and the display section 401 is capable of displaying a variety of functional screens including the copy screen.

Also, a variety of setting items are displayed on the copy screen. When a setting item is selected from the setting items displayed on the copy screen, the selected item is inputted as data. Specifically, the variety of setting items include a paper selection 501, a print density 502, a scale factor 503, a with/without-staple 504, an image data destination 505, an image data name 506, and the like.

Also, a variety of tabs are displayed on the lower part of the copy screen. In the example of FIG. 5A, the tabs include a "COPY" tab 507 and other function tabs 508 (e.g., "FAX", "SCAN", and "PC" tabs). The "COPY" tab 507 corresponds to a copy function, and the other function tabs 508 respectively correspond to other functions, (e.g., the facsimile sending/receiving function, the scan function, and the PC sending/receiving function).

In the example of FIG. 5A, the "COPY" tab is currently selected and its contents are displayed on the copy screen. In general, when any of the tabs 507 and 508 is pressed, a functional screen corresponding to the pressed tab is displayed on the touch panel 202. In other words, the tabs 507 and 508 have a switching function for switching the functional screen to be displayed on the touch panel 202.

When a user confirms the copy screen and selects "A4 normal paper" as the paper selection 501, "3" as the print density 502, "100%" as the scale factor 503 without any changes from the default setting, "staple: single/upper left" as the with/without-staple 504, "Document Box A" as the image data destination 505, and "bulletin" as the image data name 506, respectively, a reception section 402 receives the user's selections. Then the display section 401 changes background color of the selected setting items from white to gray (Step S102 of FIG. 9).

Next, when a user presses a "Start" key, the reception section 402 transmits a group of the received setting items to a storage section 403. Then, the storage section 403 stores the group of setting items as history data (Step S103 and then Step S104 of FIG. 9). More specifically, the storage section 403 is configured to store a single or plurality of groups of setting items in a time-series manner as the history data.

In an example of FIG. 8A, the history data of the copy function are stored in the form of a history data table 801. In the history data table 801, order (number) 811 and setting information 812 are correspondingly associated. The order 811 indicates the order of the sequentially stored history data. The setting information 812 includes data of a variety of setting items of the copy function (e.g., the number of copies, the paper selection, the print density, the scale factor, the with/without-staple, the image data destination, and the image data name).

Also, the reception section 402 transmits a predetermined signal to a function providing section 404 for causing the function providing section 404 to perform print processing based on the received setting items. Accordingly, the function providing section 404 starts print processing (Step S105 of FIG. 9).

When the function providing section 404 completes executing the print processing, the function providing section 404 transmits a signal of indicating completion of the print processing to a continuation reception section 405. The continuation reception section 405 receives an option of whether or not the provided function (i.e., copy function) is continuously executed through the display section 401.

Figure 5B:
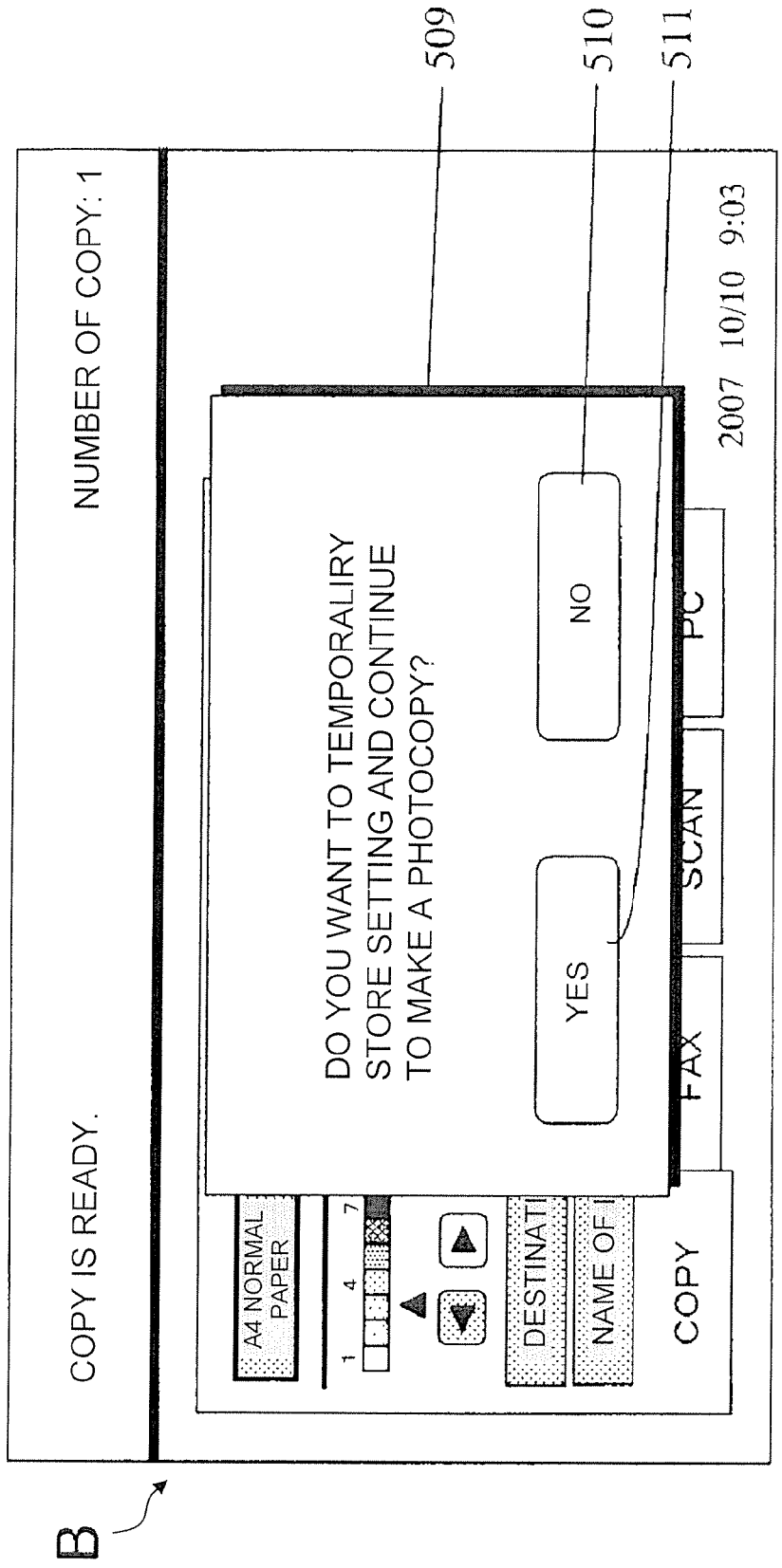
FIG. 5B is another view of the first diagram illustrating an example of a screen displayed on the touch panel.
Figure 6A:
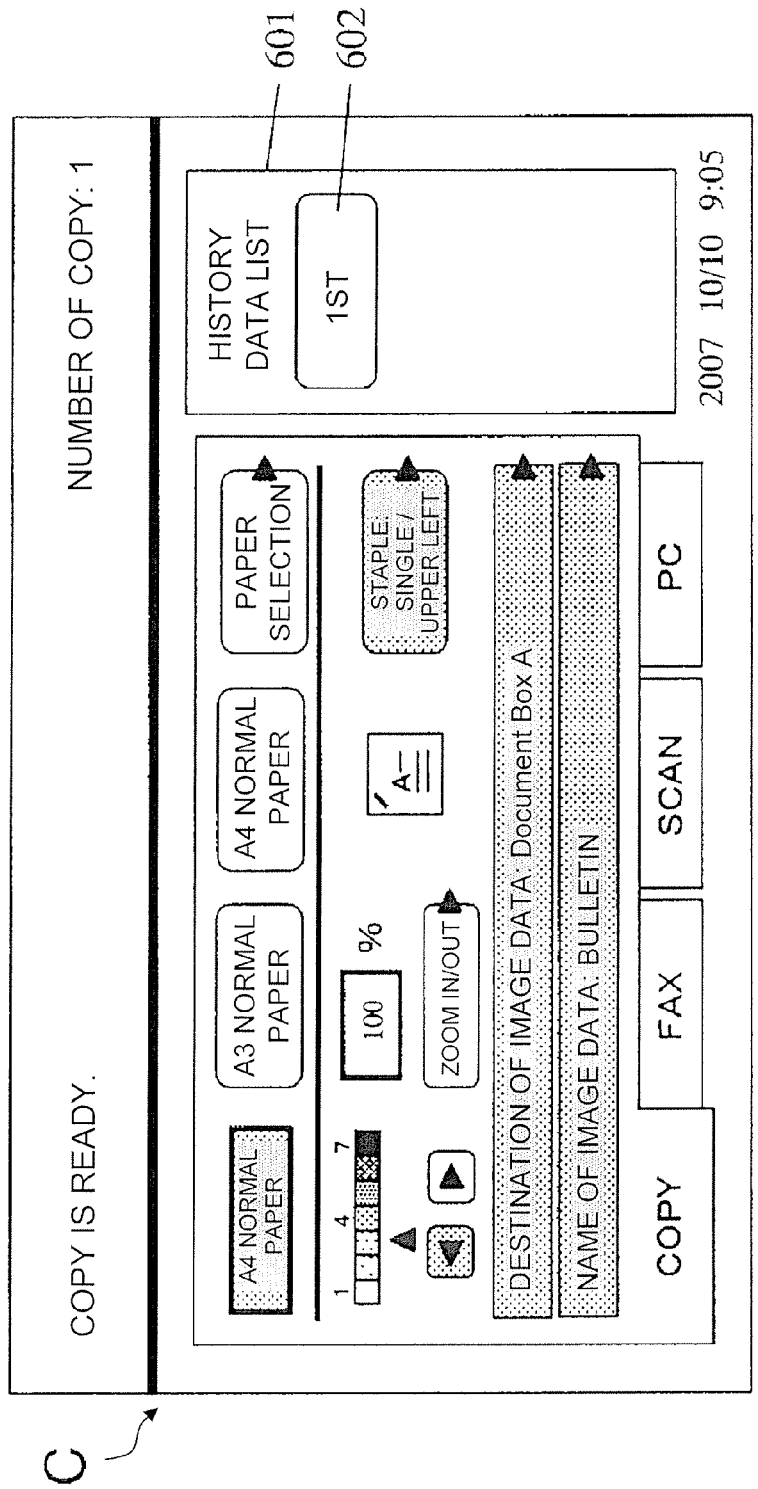
FIG. 6A is a view of a second diagram illustrating an example of a screen displayed on the touch panel.
Figure 6B:
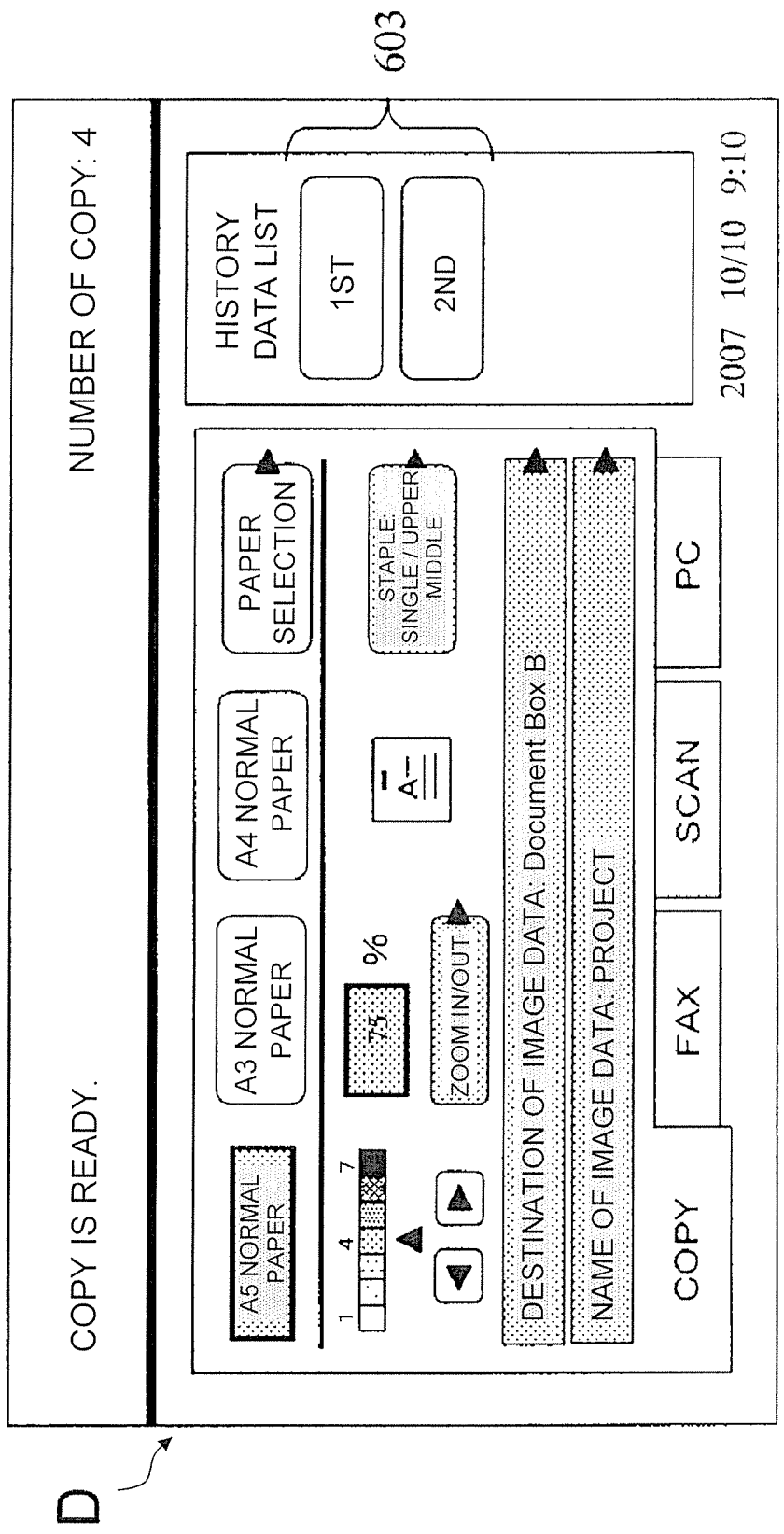
FIG. 6B is another view of the second diagram illustrating an example of a screen displayed on the touch panel.
Figure 7A:
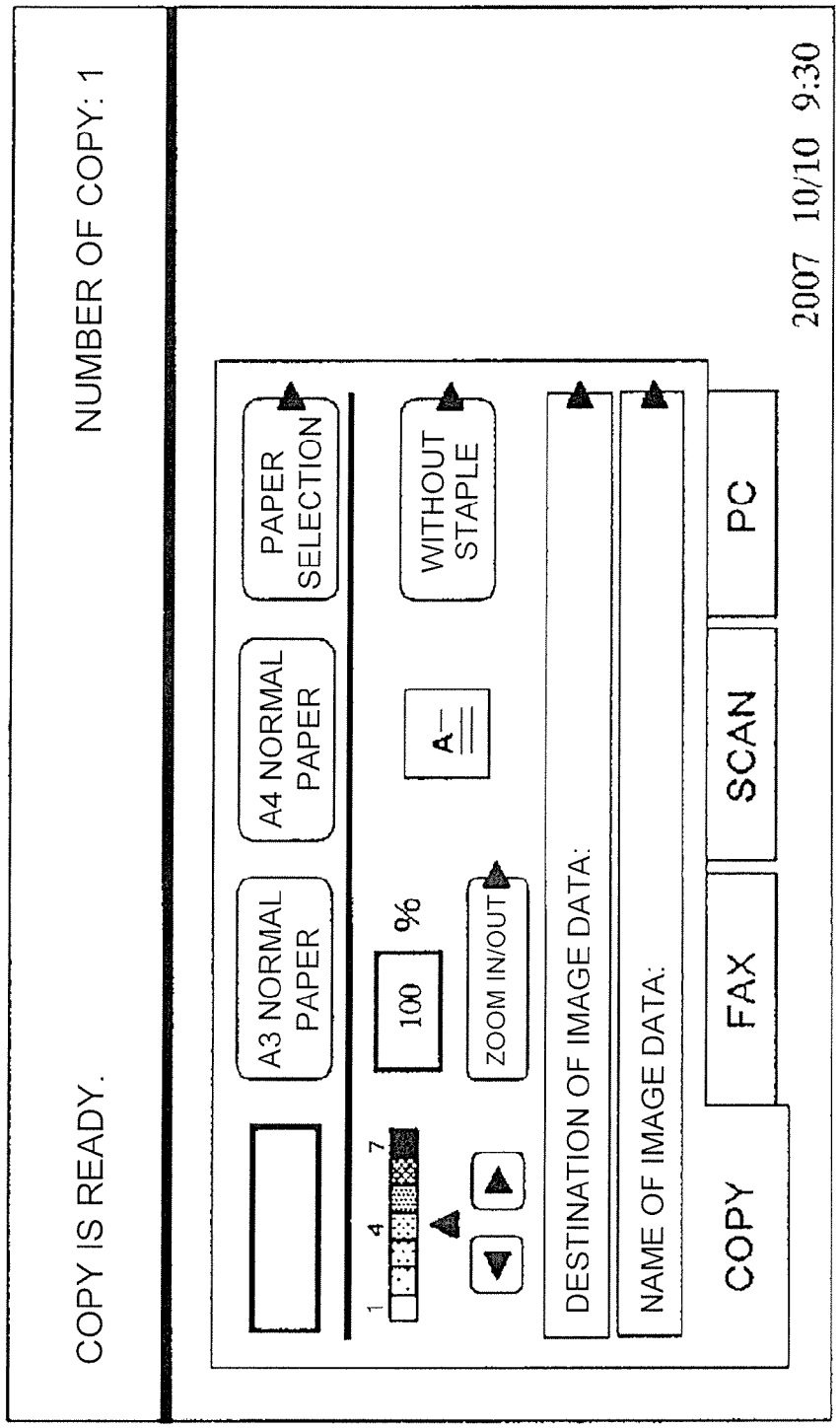
FIG. 7A is a view of a third diagram illustrating an example of a screen displayed on the touch panel.
Figure 7B:
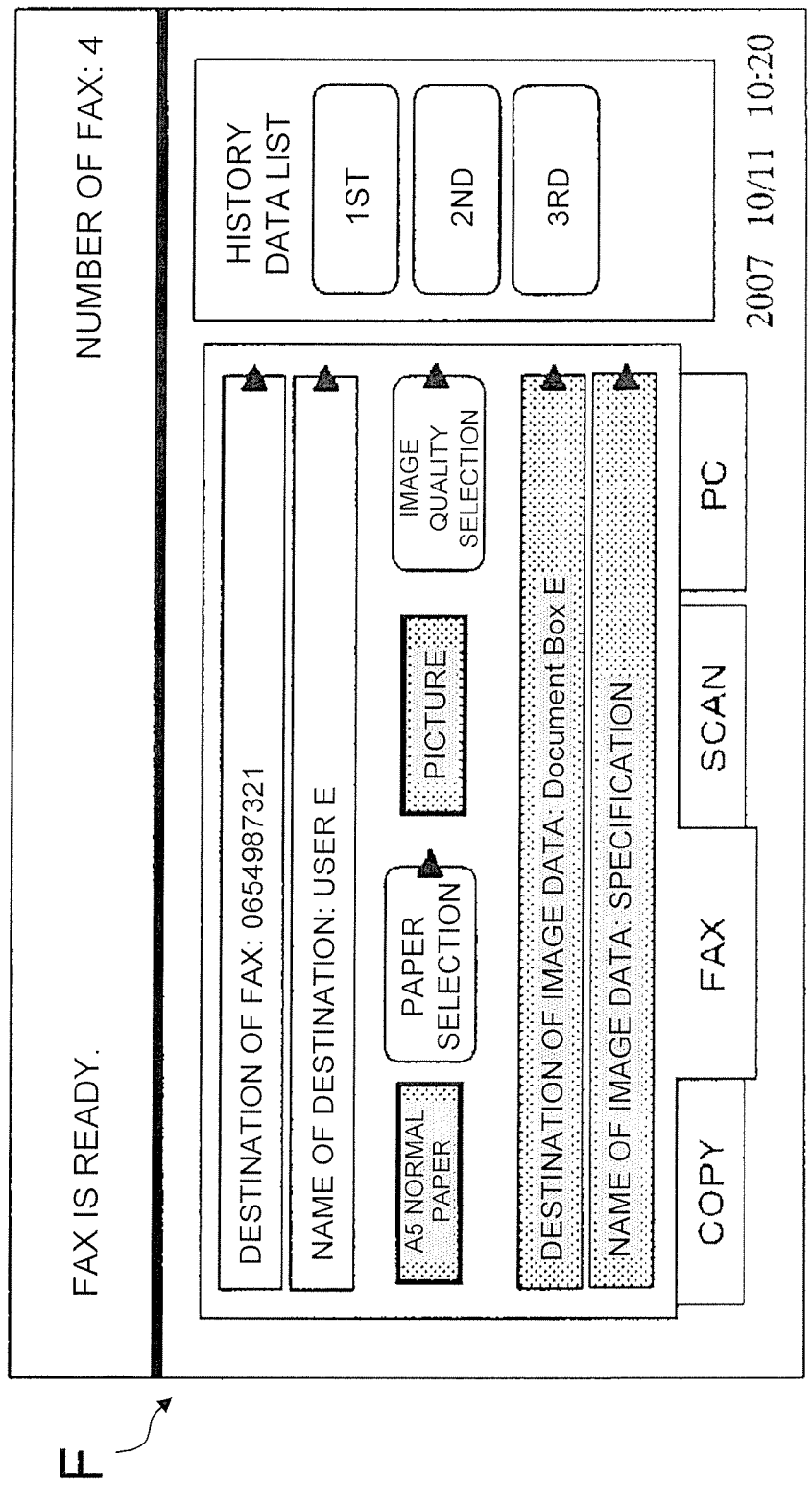
FIG. 7B is another view of the third diagram illustrating an example of a screen displayed on the touch panel.

In an example of FIG. 5B, the continuation reception section 405 displays a dialogue display area 509. Here, the dialogue display area 509 is overlapped on the copy screen. The dialogue display area 509 displays a message, "Do you want to temporarily store setting and continue to make a photocopy?" Also, the dialogue display area 509 includes a "Yes" button 511 and a "No" button 510. The "Yes" button 511 is used to select an option of continuing to photocopy, while the "No" button 510 is used to select an option of not continuing to photocopy. The continuation reception section 405 is configured to receive the option through the dialogue display area 509 with buttons 510 and 511.

When a user tries to execute continuously the copy function, the user selects the "Yes" button 511. Accordingly, the continuation reception section 405 causes the display section 401 to display the setting items relating to the copy function and to display the history data of the copy function in a list form for selecting one from the single or plurality of groups of the setting items of the copy function (Yes in Step S106 and then Step S107 of FIG. 9). As illustrated in a screen C of FIG. 6A, the display section 401 displays a history data list display area 601 in a part of the copy screen for displaying the history data of the copy function in a list form. Here, the history list display area 601 is configured not to overlap with the copy function's setting items which were displayed previously. Also, the display section 401 displays a "1st" button 602 on the history data list display area 601. The first button 602 corresponds to "1st" of the order 811 indicating the order of the history data stored in a time-series manner.

For example, if a user herein presses the "1st" button 602, the reception section 402 reads the setting information 812 correspondingly associated with the "1st" order out of the history data table 801 stored in the storage section 403. Then, print processing is started based on the setting information 812 (Yes in Step S108, and then Step S105 of FIG. 9).

As described above, when a functional setting is previously executed, a user is capable of omitting to perform the functional setting. In other words, this reduces user's operational load and enhances user's operational convenience. Consequently, a user is capable of easily and quickly completing a task relating to the copy function. It should be noted that when the processing of a function is executed with the use of the history data, the setting of the function is configured not to be re-stored as the history data.

On the other hand, when a user newly selects setting items without selecting the "1st" button 602 and then presses the "Start" key, the newly selected group of setting items is further stored as the history data (No in Step S108 and then Step S102 of FIG. 9). In this case, "2nd" is assigned to the stored history data as the order of the history data stored in a time-series manner.

When a second print processing is completed, the continuation reception section 405 displays the dialogue display area 509 again. Then, when a user presses the "Yes" button 511 in the dialogue display area 509, an order group 603 of the stored history data is displayed on the history list display area 601 of the copy screen. Specifically, as illustrated in a screen D of FIG. 6B, the "1st" and "second" buttons are displayed in a list form. For example, the buttons are arranged from top to the bottom in an ascending order. With the list display, a user is capable of easily duplicating the previous inputted settings. When the history list display area 601 is not capable of simultaneously displaying the entire order group 603, a scroll bar may be displayed on the history list display area 601. Thus a user is capable of selecting all the history data of the order group 603 by operating the scroll bar.

On the other hand, when a user does not continuously execute the copy function and presses the "No" button 510 displayed by the continuation reception section 405, the continuation reception section 405 receives a signal of discontinuation of the copy function and transmits a signal to a initialization section 406 to cause the initialization section 406 to execute initialization of the previously-set setting items (No in Step 106 and then Step 109 of FIG. 9). Accordingly, the initialization section 406 initializes the previously-set setting items, and clears the history data table 801 of the copy function stored in the storage section 403 (Step S110 of FIG. 9). When the initialization and clearance are completed, the copy screen is accordingly initialized. Then, the initialized copy screen is displayed on the touch panel 202. Specifically, as illustrated in a screen E of FIG. 7A, the initialized copy screen displays setting items with white background. Accordingly, previously-executed functional setting does not disturb a new functional setting operation, and a user is prevented from performing an erroneous operation (e.g., erroneous photocopy). Also, the stored history data are not abused by a third party, and thereby information security will be protected.

In the above embodiment, the procedure of performing the copy function has been explained. Basically, other functions (e.g., facsimile transmission/reception function) are performed in the same procedure as the copy function. However, there is a difference between the procedure of performing the copy function and that of performing the facsimile transmission/reception function as follows. Specifically, when the facsimile transmission/reception function is performed, a variety of setting items relating to the facsimile transmission/reception function is displayed on a facsimile screen. As illustrated in a screen F of FIG. 7B, the setting items include "destination of facsimile" and "name of the destination". Also, as illustrated in FIG. 8B, the setting information (e.g., destination of facsimile and name of transmission) is stored in a history data table 802 of the facsimile transmission/reception function. When the facsimile transmission/reception function is not continuously executed, the setting information is all cleared. Accordingly, data leakage of the history data will be blocked.

As described above, when a function is continuously executed, setting items of the function are displayed and the history data are displayed in a list form for selecting one from the single or plurality of groups of the setting items. On the other hand, when the function is not continuously executed, the functional setting is initialized and the history data are all cleared.

Thus, when a function is continuously executed, it is possible to omit to execute the functional setting operation with use of the history data. Accordingly, this reduces a user's operational load and enhances a user's operational convenience. Furthermore, when a function is not continuously executed, the functional setting is initialized and the history data are all cleared. Accordingly, a previously-executed functional setting does not disturb a new functional setting. In other words, a user is prevented from performing an erroneous operation (e.g., erroneous photocopy).

In the present embodiment, the continuation reception section 405 is configured to receive an option of whether or not a function is continuously executed through the dialogue display area 509. However, the continuation reception section 405 may be configured to receive the option with other methods. For example, the option may be received when a user presses a separately-provided continuation button.

Furthermore, while the continuation reception section 405 displays the dialogue display area 509, signals corresponding to other keys may be configured to be negated. Accordingly, a user is capable of reliably determining if a function is continuously executed.

Also, according to the present embodiment, only the order 811 of the history data is displayed on the history list display area 601. However, when the history list display area 601 has enough space, a part or all of the setting information 812 of the history data may be configured to be displayed on the history list display area 601. Also, when there are a lot of setting items, only a single or plurality of heavily-used setting items or a single or plurality of setting items necessary for a user may be configured to be displayed on the history list display area 601.

Also, a timer section 407 may be further provided in the present embodiment. The timer section 407 is configured to count a predetermined period of time after the function providing section 404 provides a function. When a predetermined period of time is elapsed, the continuation reception section 405 is configured to initialize the functional setting and clear all the history data.

Thus, even when a user does not determine if a function is continuously executed, initialization and clearance of the history data are performed after a predetermined period of time. In other words, initialization of the history data is automatically executed even when a user forgets to determine if a function is continuously executed or even when a user is temporarily away from the image forming apparatus on an urgent business. Therefore, a previously-executed functional setting does not disturb a new functional setting. Consequently, a user is capable of smoothly performing a functional setting as desired.

The predetermined period of time depends on usage frequency and an installation place of the image forming apparatus. For example, the predetermined period of time may be set to 10 minutes, 30 minutes, or an hour. As is apparent from this disclosure, the predetermined period of time may be extended or shortened depending on the user's usage condition.

Also, an authentication section 408 may be further provided in the present embodiment. The authentication section 408 is configured to authenticate a user based on user authentication information for uniquely specifying a user. Only when a user is authenticated, the storage section 403 may be configured to store a group of setting items of a function as the history data and the continuation reception section 405 may be configured to receive an option of whether or not the function is continuously executed.

In this case, the storage section 403 and the continuation reception section 405 are activated only when a user is authenticated. Then, the option of whether or not the function is continuously executed is received through the dialogue display area 509. Furthermore, the history data of the authenticated user are available. Therefore, when a user is not authenticated, the unauthorized user is not capable of accessing the history data. Accordingly, a user is completely prevented from performing an erroneous setting. Furthermore, only when a user has previously executed a functional setting, the user is capable of conveniently and repeatedly performing the functional setting operation.

Also, the authentication section 408 may be configured to authenticate user identification information to be obtained when an ID card is swiped through a card reader. Also, the authentication section 408 may be configured to authenticate user identification information to be obtained through a password input screen displayed on the touch panel 202.

Also, the operating section 102 may be configured to be activated only when a user is authenticated. Accordingly, only the authenticated user is capable of operating the operating section 102. This is effective for preventing a user from erroneously performing a functional setting when the functional setting has been previously executed.

As described above, the image forming apparatus of the present invention is available as a variety of machines (e.g., a copier and a MFP). Also, the image forming apparatus of the present invention effectively works for enhancing convenience of a functional setting when a user repeatedly executes the functional setting and for preventing a user from performing an erroneous functional setting.

General Interpretation

A used herein, the following directional terms "forward, rearward, above, downward, vertical, horizontal, below, and transverse" as well as any other similar directional terms refer to those directions of a device equipped with the present invention. Accordingly, these terms, as utilized to describe aspects of the present invention, should be interpreted relative to a device equipped with the present invention.

The term "configured" as used herein to describe a component, section or part of a device includes hardware and/or software that is constructed and/or programmed to carry out the desired function.

Terms that are expressed as "means-plus function" in the claims should include any structure that can be utilized to carry out the function of that part of the present invention.

The term "comprising" and its derivatives, as used herein, are intended to be open ended terms that specify the presence of the stated features, elements, components, groups, integers, and/or steps, but do not exclude the presence of other unstated features, elements, components, groups, integers, and/or steps. The foregoing also applied to words having similar meanings such as the terms, "including," "having," and their derivatives. Also, the term "part," "section," "portion," "member," or "element" when used in the singular can have the dual meaning of a single part or a plurality of parts.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. An image forming apparatus being configured to provide a plurality of functions, comprising:
    a display section being configured to display a plurality of setting items as a group, the setting items relating to only one of the plurality of functions:
    a storage section being configured to store a single or plurality of groups of setting items relating to a function in a time-series manner as history data in the storage section when the function is provided; and
    a continuation reception section being configured to receive an option of whether or not the provided function is to be continued to be executed, the continuation reception section being configured to cause the display section to display the group of the setting items relating to the provided function and to display the history data in a list form to select one from the single or plurality of groups of the setting items relating to the provided function when the continuation reception section receives the option to continue to execute the provided function, the continuation reception section being configured to initialize setting of the provided function and to clear all the history data relating to the provided function from the storage section when the continuation reception section receives the option not to continue to execute the provided function.

2. The image forming apparatus according to claim 1, further comprising
    an authentication section configured to authenticate a user based on user identification information, wherein
    the storage section is configured to store the single or plurality of groups of the setting items as the history data only when the authentication section executes user authentication, and
    the continuation reception section is configured to receive the option of whether or not the provided function is to be continued to be executed only when the authentication section executes user authentication.

3. The image forming apparatus according to claim 1, wherein the continuation reception section is configured to display a dialogue display area that shows an option to continue to execute the provided function and to store temporarily the group of the setting items relating to the provided function which is displayed by the display section.

4. The image forming apparatus according to claim 3, wherein the provided function is a copy function, a facsimile sending/receiving function, a scan function, or a PC sending/receiving function.

5. The image forming apparatus according to claim 1, further comprising
    a timer section configured to count a predetermined period of time after the function is provided, wherein
    the continuation reception section is configured to initialize the setting of the function and to clear all the history data when the predetermined period of time has elapsed.

6. The image forming apparatus according to claim 1, further comprising
    a timer section configured to count a predetermined period of time after the function is provided, wherein
    the continuation reception section is configured to initialize the setting of the function and to clear all the history data when the predetermined period of time has elapsed, and
    an authentication section configured to authenticate a user based on user identification information, wherein
    the storage section is configured to store the single or plurality of groups of the setting items as the history data only when the authentication section executes user authentication, and
    the continuation reception section is configured to receive the option of whether or not the provided function is to be continued to be executed only when the authentication section executes user authentication.

7. The image forming apparatus according to claim 1, further comprising
    a timer section configured to count a predetermined period of time after the function is provided, wherein the continuation reception section is configured to initialize the setting of the function and to clear all the history data when the predetermined period of time has elapsed, and an authentication section configured to authenticate a user based on user identification information, wherein the storage section is configured to store the single or plurality of groups of the setting items as the history data only when the authentication section executes user authentication, the continuation reception section is configured to receive the option of whether or not the provided function is to be continued to be executed only when the authentication section executes user authentication, and the continuation reception section is further configured to cause the display section to display the group of the setting items relating to the provided function and the history data in different display areas when the continuation reception section receives the option to continue to execute the provided function.

8. The image forming apparatus according to claim 1, wherein the continuation reception section is further configured to cause the display section to display the group of the setting items relating to the provided function and the history data in different display areas when the continuation reception section receives the option to continue to execute the provided function.

9. The image forming apparatus according to claim 1, further comprising a timer section configured to count a predetermined period of time after the function is provided, wherein the continuation reception section is configured to initialize the setting of the function and to clear all the history data when the predetermined period of time has elapsed, and the continuation reception section is further configured to cause the display section to display the group of the setting items relating to the provided function and the history data in different display areas when the continuation reception section receives the option to continue to execute the provided function.

10. The image forming apparatus according to claim 1, wherein the continuation reception section is further configured to cause the display section to display the group of the setting items relating to the provided function and the history data on one screen when the continuation reception section receives the option to continue to execute the provided function.

11. An image forming apparatus being configured to provide a plurality of functions, comprising:

a display section being configured to display a plurality of setting items as a group, the setting items relating to only one of the plurality of functions;

a storage section being configured to store a single or plurality of groups of setting items relating to a function in a time-series manner as history data when the function is provided; and a continuation reception section being configured to receive an option of whether or not the provided function is to be continued to be executed, the continuation reception section being configured to cause the display section to display the group of the setting items relating to the provided function and the history data in a list form to select one from the single or plurality of groups of the setting items relating to the provided function when the continuation reception section receives the option to continue to execute the provided function, the continuation reception section being configured to initialize setting of the provided function and to clear all the history data when the continuation reception section receives the option not to continue to execute the provided function, and further comprising a timer section configured to count a predetermined period of time after the function is provided, wherein the continuation reception section is configured to initialize the setting of the function and to clear all the history data when the predetermined period of time has elapsed.

12. An image forming apparatus being configured to provide a plurality of functions, comprising:

a display section being configured to display a plurality of setting items as a group, the setting items relating to only one of the plurality of functions;

a storage section being configured to store a single or plurality of groups of setting items relating to a function in a time-series manner as history data when the function is provided; and a continuation reception section being configured to receive an option of whether or not the provided function is to be continued to be executed, the continuation reception section being configured to cause the display section to display the group of the setting items relating to the provided function and the history data in a list form to select one from the single or plurality of groups of the setting items relating to the provided function when the continuation reception section receives the option to continue to execute the provided function, the continuation reception section being configured to initialize setting of the provided function and to clear all the history data when the continuation reception section receives the option not to continue to execute the provided function, wherein the continuation reception section is further configured to cause the display section to display the group of the setting items relating to the provided function and the history data in different display areas when the continuation reception section receives the option to continue to execute the provided function.

* * * * *